United States Patent
Wang (10) Patent No.: US 10,079,772 B2
(45) Date of Patent: Sep. 18, 2018

(54) QUEUE SCHEDULING METHOD AND DEVICE, AND COMPUTER STORAGE MEDIUM

(71) Applicant: SANECHIPS TECHNOLOGY CO., LTD., Shenzhen (CN)

(72) Inventor: Bin Wang, Guangdong (CN)

(73) Assignee: SANECHIPS TECHNOLOGY CO., LTD., Shenzhen (CN)

(*) Notice: Subject to any disclaimer, the term of this patent is extended or adjusted under 35 U.S.C. 154(b) by 151 days.

(21) Appl. No.: 15/108,385

(22) PCT Filed: May 20, 2014

(86) PCT No.: PCT/CN2014/077915
§ 371 (c)(1),
(2) Date: Jun. 27, 2016

(87) PCT Pub. No.: WO2015/100915
PCT Pub. Date: Jul. 9, 2015

(65) Prior Publication Data
US 2016/0330128 A1    Nov. 10, 2016

(30) Foreign Application Priority Data
Dec. 30, 2013  (CN) .......................... 2013 1 0750600

(51) Int. Cl.
*H04L 1/00*        (2006.01)
*H04L 12/26*       (2006.01)
(Continued)

(52) U.S. Cl.
CPC .......... *H04L 47/6215* (2013.01); *H04L 12/10* (2013.01)

(58) Field of Classification Search
CPC .......................... H04L 47/6215; H04L 12/10
See application file for complete search history.

(56) References Cited

U.S. PATENT DOCUMENTS 4,896,261 A      1/1990 Nolan

FOREIGN PATENT DOCUMENTS

| CN | 101060463 | 10/2007 |
| CN | 101060463 A | * 10/2007 |

(Continued)

OTHER PUBLICATIONS

International Search Report for PCT/CN2014/077915, dated Jul. 30, 2014, 4 pages.

*Primary Examiner* — Maharishi V Khirodhar
(74) *Attorney, Agent, or Firm* — Nixon & Vanderhye P.C.

(57) ABSTRACT

Embodiments of the present disclosure disclose a queue scheduling method and device, and a computer storage medium. The method includes: arranging a scheduling expansion unit; receiving an enqueuing trigger message by the scheduling extension unit after a queue is written in a queue cache, where the enqueuing trigger message has a queue identifier and queue information of the queue; writing the queue identifier in a queue identifier cache and setting a state of the queue identifier to be in the queue identifier cache by the scheduling extension unit; sending an enqueuing report to a scheduling unit by the scheduling extension unit when no authorization arrives; and determining, by the scheduling unit, whether to schedule the queue according to the queue information of the queue.

20 Claims, 2 Drawing Sheets

(51) Int. Cl.
*H04L 12/28* (2006.01)
*H04L 12/863* (2013.01)
*H04L 12/10* (2006.01)

(56) References Cited

FOREIGN PATENT DOCUMENTS

| | | |
|---|---|---|
| CN | 101902487 | 12/2010 |
| CN | 102546098 | 7/2012 |
| CN | 102546098 A * | 7/2012 |

* cited by examiner

QUEUE SCHEDULING METHOD AND DEVICE, AND COMPUTER STORAGE MEDIUM

This application is the U.S. national phase of International Application No. PCT/CN2014/077915 filed 20 May 2014, which designated the U.S. and claims priority to CN Patent Application No. 201310750600.5 filed 30 Dec. 2013, the entire contents of each of which are hereby incorporated by reference.

TECHNICAL FIELD

The present disclosure relates to queue management technologies in the field of communications, and particularly to a queue scheduling method and device, and a computer storage medium.

BACKGROUND

With rapid development of Internet, to achieve high-speed forward processing of messages, a specialized traffic management chip is generally adopted in a router to complete caching and scheduling output of high-speed data streams. Moreover, scheduling shall be conducted as required by Quality of Service (QoS) in accordance with an issued authorization.

A specific processing procedure generally includes: first receiving messages to complete caching of message queueing, i.e., message enqueuing is completed so as to update queue information, and an authorization would be issued by an authorization system so that message dequeuing would further update queue information and consume authorizations. A scheduling module judges whether a queue is required to be scheduled according to real-time queue information and a queue authorized value. If the queue has a message and an authorization, one message of the queue is to be scheduled for dequeuing processing as well as updates of authorization deduction and queue depth.

Meanwhile, a queue management must be able to process all IP packets of 64-16384 bytes at wire speed. At an Ethernet environment of 200 Gbps, a typical relationship between an IP packet length and an IP packet forward rate is shown in Table 1, where the unit of the IP packet forward rate is Million Packet Per Second (MPPS).

TABLE 1

| IP Packet Length (Byte) | IP Packet Forward Rate (MPPS) |
|---|---|
| 64 | 297.6190476 |
| 128 | 168.9189189 |
| 256 | 90.57971014 |
| 512 | 46.9924812 |
| 1024 | 23.94636015 |
| 1500 | 16.44736842 |
| 16384 | 1.524018532 |

It is known from Table 1 that a chip needs to provide a packet processing capability of 300 MPPS to meet requirements. At a system clock of 600 MHz, enqueuing and dequeuing operations are processed once every two cycles correspondingly, and a bandwidth authorized is up to 50 MPPS; and for scheduling, enqueuing, dequeuing and authorization trigger shall be processed simultaneously and a bandwidth is required to reach 650 MPPS. However, such bandwidth requirements cannot be achieved through division of time slots. If a method of crowding enqueuing through an authorization is adopted, an enqueuing bandwidth will not be ensured and messages of some bytes will not reach wire speed. These problems are required to be solved.

SUMMARY

In view of this, embodiments of the present disclosure are expected to is provide a queue scheduling method and device capable of adapting to high-speed and mass-storage queue scheduling, realizing wire speed enqueuing and wire speed dequeuing and ensuring that a queue management processes QoS requirements for bandwidth and traffic management when an authorization arrives.

To achieve above purpose, technical solutions in embodiments of the present disclosure are realized as follows.

In a first aspect, embodiments of the present disclosure provide a queue scheduling method, where a scheduling extension unit is arranged. The method further includes:

receiving an enqueuing trigger message by the scheduling extension unit after a queue is written in a queue cache, where the enqueuing trigger message includes a queue identifier;

writing the queue identifier in a queue identifier cache and setting a state of the queue identifier to be in the queue identifier cache by the scheduling extension unit;

acquiring queue information of the queue and sending an enqueuing report to a scheduling unit by the scheduling extension unit when no authorization arrives; and determining, by the scheduling unit, whether to schedule the queue according to the queue information of the queue.

In accordance with a first possible realization mode, in combination with the first aspect, writing the queue identifier in a queue identifier cache and setting a state of the queue identifier to be in the queue identifier cache by the scheduling extension unit, includes:

searching the queue identifier cache by the scheduling extension unit according to the queue identifier;

writing the queue identifier in the queue identifier cache and setting a state of the queue identifier to be in the queue identifier cache when the queue identifier is not in the queue identifier cache; and stopping processing the queue identifier cache and the state of the queue identifier when the queue identifier is in the queue identifier cache.

In accordance with a second possible realization mode, in combination with the first aspect, sending an enqueuing report to a scheduling unit by the scheduling extension unit when no authorization arrives, includes:

reading the queue identifier from the queue identifier cache and setting a state of the queue identifier to be not in the queue identifier cache;

reading the queue information of the queue to form an enqueuing report according to the read queue identifier; and sending the enqueuing report to the scheduling unit.

In accordance with a third possible realization mode, in combination with the first aspect, the method further includes: reading, by the scheduling extension unit when an authorization arrives, the queue information of the queue according to an authorized queue number when an authorization arrives to form an authorization report; and sending the authorization report to the scheduling unit.

In accordance with a fourth possible realization mode, in combination with the first aspect and any of the first to the third possible realization modes, the is method further includes:

reading the queue out of the queue cache and sending current queue information of the queue to the scheduling unit as a dequeuing report.

In accordance with a fifth possible realization mode, in combination with the fourth possible realization modes, the queue information includes a queue depth and a queue authorized value;

accordingly, determining, by the scheduling unit, whether to schedule the queue according to the queue information of the queue includes: setting a scheduling state of the queue by the scheduling unit.

Determining, by the scheduling unit, whether the queue is to be scheduled according to the queue information of the queue after the scheduling unit receives the enqueuing report or the authorization report, includes:

scheduling the queue and setting a scheduling state of the queue as a scheduling joined state by the scheduling unit when a scheduling state of the queue is a scheduling-unjoined state, and a queue depth and a queue authorized value of the queue are not zero; and discarding the enqueuing report or the authorization report and stopping processing the queue by the scheduling unit when the scheduling state of the queue is a scheduling joined state, and a queue depth or a queue authorized value of the queue is zero;

determining, by the scheduling unit, whether to schedule the queue according to the queue information of the queue after the scheduling unit receives the dequeuing report, includes:

scheduling the queue and keeping a scheduling state of the queue unchanged by the scheduling unit when a queue depth of the queue is not zero and a queue authorized value of the queue is not zero; and discarding the dequeuing report and setting a scheduling state of the queue as a scheduling-unjoined state by the scheduling unit when a condition that the queue depth of the queue is not zero and the queue authorized value of the queue is not zero is not met.

In a second aspect, embodiments of the present disclosure provide a queue scheduling device, including: a scheduling extension unit and a scheduling unit, where the scheduling extension unit is configured for: receiving an enqueuing trigger message after a queue is written in a queue cache, where the enqueuing trigger message includes a queue identifier and queue information of the queue;

writing the queue identifier in the queue identifier cache and setting a state of the queue identifier to be in the queue identifier cache;

acquiring queue information of the queue and sending an enqueuing report to the scheduling unit when no authorization arrives;

the scheduling unit is configured for: determining whether to schedule the queue according to the queue information of the queue.

In accordance with the first possible realization mode, in combination with the second aspect, the scheduling extension unit is configured for:

searching the queue identifier cache according to the queue identifier;

writing the queue identifier in the queue identifier cache and setting a state of the queue identifier to be in the queue identifier cache when the queue identifier is not in the queue identifier cache; and stopping processing the queue identifier cache and the state of the queue identifier when the queue identifier is in the queue identifier cache.

In accordance with the second possible realization mode, in combination with the second aspect, the device further includes an authorization unit configured for sending an authorization to the scheduling unit by the scheduling extension unit;

accordingly, when no authorization arrives, the scheduling extension unit is configured for:

reading the queue identifier from the queue identifier cache and setting a state of the queue identifier to be not in the queue identifier cache;

reading the queue information of the queue to form an enqueuing report according to the read queue identifier; and sending the enqueuing report to the scheduling unit.

In accordance with the third possible realization mode, in combination with the second aspect, when an authorization arrives, the scheduling extension unit is configured for:

reading the queue information of the queue according to an authorized queue number when an authorization arrives to form an authorization report; and sending the authorization report to the scheduling unit.

In accordance with the fourth possible realization mode, in combination with the second aspect and any of the first to the third possible realization modes, the device further includes an dequeuing management unit configured for reading the queue out of the queue cache and sending current queue information of the queue to the scheduling unit as a dequeuing report.

In accordance with a fifth possible realization mode, in combination with the fourth possible realization modes, the queue information includes a queue depth and a queue authorized value;

accordingly, the scheduling unit is configured for setting a scheduling state of the queue;

after receiving the enqueuing report or the authorization report, the scheduling unit is further configured for:

scheduling the queue and setting a scheduling state of the queue as a scheduling joined state when a scheduling state of the queue is a scheduling-unjoined state and a queue depth and a queue authorized value of the queue are not zero; and discarding the enqueuing report or the authorization report and stopping processing the queue when a scheduling state of the queue is a scheduling-joined state and a queue depth or a queue authorized value of the queue is zero;

after receiving the dequeuing report, the scheduling unit is further configured for:

scheduling the queue and keeping a scheduling state of the queue unchanged when a queue depth of the queue is not zero and a queue authorized value of the queue is not zero; and discarding the dequeuing report and setting a scheduling state of the queue as a scheduling-unjoined state when a condition that the queue depth of the queue is not zero and the queue authorized value of the queue is not zero is not met.

In a third aspect, embodiments of the present disclosure provide a computer storage medium in which a computer executable instruction is stored and is used for executing the above-mentioned method.

By arranging a scheduling extension unit in front of the scheduling unit and maintaining, by the scheduling extension unit, the queue identifier cache and a state of the queue identifier, the queue scheduling method and device provided in embodiments of the present disclosure reduce bandwidth sent to the scheduling unit and are capable of adapting to high-speed and mass-storage queue scheduling, realize wire speed enqueuing and wire speed dequeuing and ensure that a queue management processes QoS requirements for bandwidth and traffic management when an authorization arrives.

DETAILED DESCRIPTION

The technical solutions in embodiments of the present disclosure will be clearly and fully described below in combination with drawings in embodiments of the present disclosure.

Figure 1:
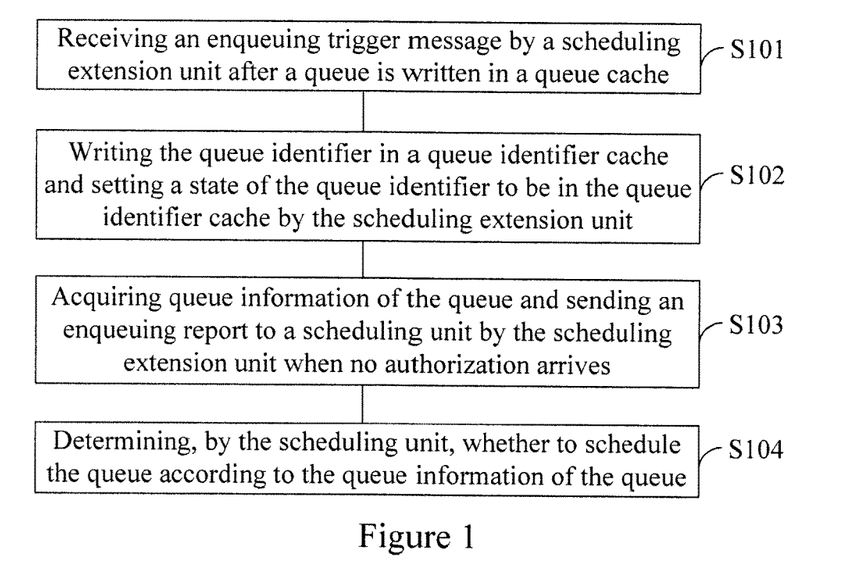
FIG. 1 is a flow diagram showing a queue scheduling method provided in embodiments of the present disclosure.

FIG. 1 shows a queue scheduling method, which can be applied in a device for queue scheduling, provided in embodiments of the present disclosure, including:

S101: Receiving an enqueuing trigger message by a scheduling extension unit after a queue is written in a queue cache;

Exemplarily, prior to step S101, the method may further include arranging the scheduling extension unit in which a First Input First Output (FIFO) queue identifier cache may be arranged for caching a queue identifier. A depth of the queue identifier cache is equal to number of queues, and the scheduling extension unit may further correspondingly set a state of a queue identifier for each queue for indicating whether the queue identifier is in the queue cache.

Exemplarily, the enqueuing trigger message includes the queue identifier. Specifically, in the embodiment, the queue identifier may be obtained by a device for writing the queue after the queue is completely written in the queue cache.

S102: Writing the queue identifier in a queue identifier cache and setting a state of the queue identifier to be in the queue identifier cache by the scheduling extension unit;

Exemplarily, step S102 may specifically include:

searching the queue identifier cache by the scheduling extension unit according to the queue identifier;

writing the queue identifier in the queue identifier cache and setting a state of the queue identifier to be in the queue identifier cache when the queue identifier is not in the queue identifier cache; and stopping processing the queue identifier cache and the state of the queue identifier when the queue identifier is in the queue identifier cache.

S103: Acquiring queue information of the queue and sending an enqueuing report to a scheduling unit by the scheduling extension unit when no authorization arrives;

Exemplarily, the enqueuing report includes queue information of the queue for prompting the scheduling unit that the queue is in a ready-to-dequeue state. The queue information of the queue may be obtained by the scheduling extension unit before the enqueuing report is sent so that the obtained queue information of the queue is up-to-date queue information of the queue.

Specifically, when no authorization arrives, sending an enqueuing report to a scheduling unit by the scheduling extension unit may include:

reading the queue identifier from the queue identifier cache and setting a state of the queue identifier to be not in the queue identifier cache by the scheduling extension unit;

reading the queue information of the queue to form an enqueuing report by the scheduling extension unit according to the read queue identifier; and sending the enqueuing report by the scheduling extension unit to the scheduling unit.

It should be noted that the authorization is sent by an authorization unit which is configured for sending the authorization to the scheduling unit through the scheduling extension unit. At this moment, the scheduling extension unit conducts processing according to whether the authorization arrives or not in a Strict Priority (SP) manner.

In the embodiment, when an authorization arrives, the scheduling extension unit reads the queue information of the queue according to an authorized queue number when an authorization arrives to form an authorization report, and sends the authorization report to the scheduling unit.

However, when no authorization arrives, the scheduling extension unit is would send an enqueuing report to the scheduling unit, i.e., giving priority to the authorization when an authorization arrives, and processing the enqueuing report when no authorization arrives.

S104: Determining, by the scheduling unit, whether to schedule the queue according to the queue information of the queue.

Exemplarily, the method may further include: reading the queue out of the queue cache and sending current queue information of the queue to the scheduling unit as a dequeuing report.

Accordingly, determining, by the scheduling unit, whether to schedule the queue according to the queue information of the queue may specifically include: setting a scheduling state of the queue by the scheduling unit for indicating whether the queue is to be scheduled.

The scheduling unit conducts different processing according to different types of received reports. In the embodiment, optionally, determining, by the scheduling unit, whether the queue is to be scheduled according to the queue information of the queue after the scheduling unit receives the enqueuing report or the authorization report may specifically include:

scheduling the queue and setting a scheduling state of the queue as a scheduling-joined state by the scheduling unit when a scheduling state of the queue is a scheduling-unjoined state, and a queue depth and a queue authorized value of the queue are not zero; and discarding the enqueuing report or the authorization report and stopping processing the queue by the scheduling unit when a scheduling state of the queue is a scheduling-joined state, and a queue depth or a queue authorized value of the queue is zero.

Optionally, determining, by the scheduling unit, whether to schedule the queue according to the queue information of the queue after the scheduling unit receives the dequeuing report may specifically include:

scheduling the queue and keeping a scheduling state of the queue unchanged by the scheduling unit when a queue depth of the queue is not zero and a queue authorized value of the queue is not zero; and discarding the dequeuing report and setting a scheduling state of the queue as a scheduling-unjoined state by the scheduling unit when a condition that the queue depth of the queue is not zero and the queue authorized value of the queue is not zero is not met.

Further, after the scheduling unit receives the dequeuing report, and when the scheduling unit determines that the queue does not meet a condition that the queue authorized value is not zero, the scheduling unit would send an authorization request to the authorization unit and wait for a new authorization, sent by the authorization unit, regarding the queue.

It should be noted that only a scheduling method for writing, authorizing and reading a queue is described in detail in the embodiment. Specific processes for writing, authorizing and reading a queue will not be repeated again in the embodiment since they belong to common general knowledge in the art.

The embodiment provides a queue scheduling method. By arranging the scheduling extension unit and maintaining, by the scheduling extension unit, the queue identifier cache and a state of the queue identifier, the queue scheduling method reduces bandwidth sent to the scheduling unit and is capable of adapting to high-speed and mass-storage queue scheduling, realizes wire speed enqueuing and wire speed dequeuing and ensures that a queue management processes QoS requirements for bandwidth and traffic management when an authorization arrives.

Figure 2:
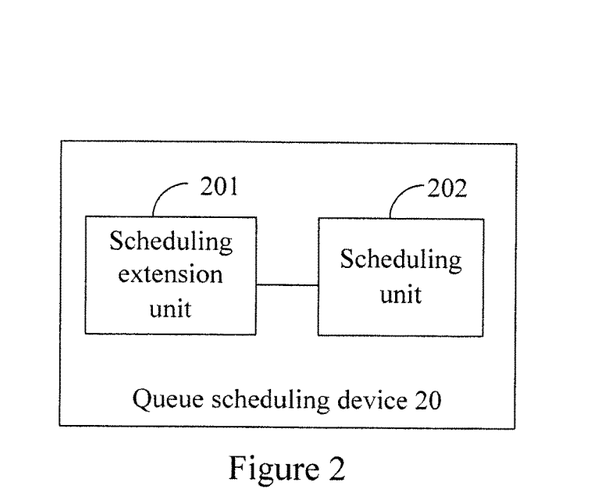
FIG. 2 is a structural diagram showing a queue scheduling device provided in embodiments of the present disclosure.

FIG. 2 shows a queue scheduling device 20 provided in embodiments of the present disclosure, including: a scheduling extension unit 201 and a scheduling unit 202.

The scheduling extension unit 201 is configured for receiving an enqueuing trigger message after a queue is written in a queue cache;

The enqueuing trigger message here includes a queue identifier.

The scheduling extension unit 201 is further configured for writing the queue identifier in a queue identifier cache and setting a state of the queue identifier to be in the queue identifier cache.

The scheduling extension unit 201 is further configured for acquiring queue information of the queue and sending an enqueuing report to the scheduling unit 202 when no authorization arrives, where the enqueuing report includes queue information of the queue for prompting the scheduling unit 202 that the queue is in a ready-to-dequeuing state.

The scheduling unit 202 is configured for determining whether to schedule the queue according to the queue information of the queue.

Exemplarily, in the embodiment, the queue identifier may be obtained by a device for writing the queue after the queue is completely written in the queue cache.

Figure 3:
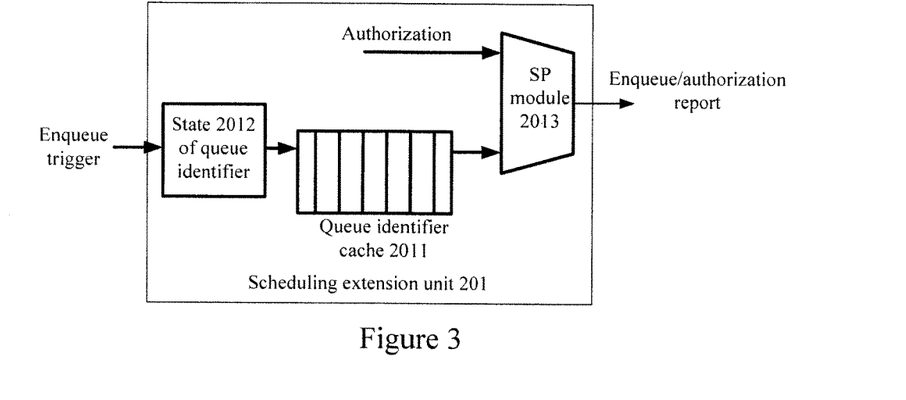
FIG. 3 is a structural diagram showing a scheduling extension unit provided in embodiments of the present disclosure.

Exemplarily, as shown in FIG. 3, the scheduling extension unit 201 may include an FIFO queue identifier cache 2011 configured for caching the queue identifier, where a depth of the queue identifier cache 2011 is equal to number of queues, and the scheduling extension unit 201 may further correspondingly set a state 2012 of the queue identifier for each queue, where the state 2012 is configured for indicating whether the queue identifier is in the queue cache.

Thus, the scheduling extension unit 201 may be specifically configured for:

searching the queue identifier cache 2011 according to the queue identifier;

writing the queue identifier in the queue identifier cache 2011 and setting a state 2012 of the queue identifier to be in the queue identifier cache 2011 when the queue identifier is not in the queue identifier cache 2011; and stopping processing the queue identifier cache 2011 and the state 2012 of the queue identifier when the queue identifier is in the queue identifier cache 2011.

Exemplarily, the enqueuing report includes queue information of the queue for prompting the scheduling unit 202 that the queue is in a ready-to-dequeue state. The queue information of the queue may be obtained by the scheduling extension unit 201 before the enqueuing report is sent so that the obtained queue information of the queue is up-to-date queue information of the queue.

Figure 4:
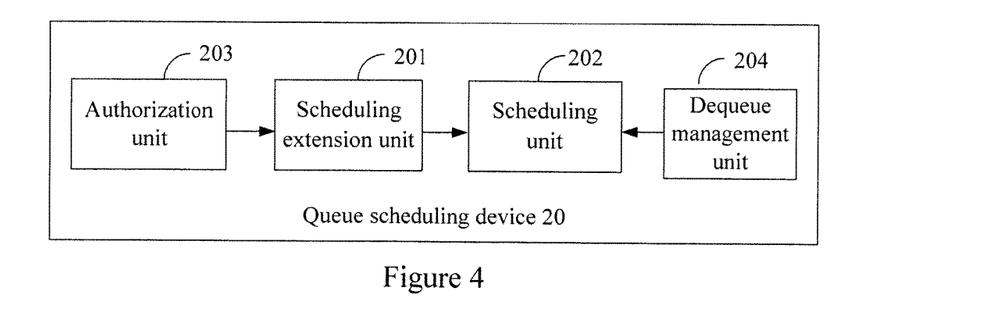
FIG. 4 is a structural diagram showing another queue scheduling device provided in embodiments of the present disclosure.

Exemplarily, as shown in FIG. 4, the queue scheduling device 20 may further include an authorization unit 203 configured for sending an authorization to the scheduling unit 202 through the scheduling extension unit 201.

Accordingly, when no authorization arrives, the scheduling extension unit 201 is specifically configured for:

reading the queue identifier from the queue identifier cache 2011 and setting a state 2012 of the queue identifier to be not in the queue identifier cache 2011;

reading the queue information of the queue to form an enqueuing report according to the read queue identifier; and sending the enqueuing report to the scheduling unit 202.

Accordingly, when an authorization arrives, the scheduling extension unit 201 is specifically configured for:

reading the queue information of the queue according to an authorized queue number when an authorization arrives to form an authorization report; and sending the authorization report to the scheduling unit 202.

It should be noted that the authorization is sent by the authorization unit 203. At this moment, as shown in FIG. 3, the scheduling extension unit 201 may further include an SP module 2013 in an SP manner, and the SP module 2013 controls processing of the enqueuing report and the authorization report according to whether the authorization arrives.

In the embodiment, when an authorization arrives, the SP module 2013 of the scheduling extension unit 201 would preferentially read the queue information of the queue according to an authorized queue number when an authorization arrives to form an authorization report, and send the authorization report to the scheduling unit 202.

However, when no authorization arrives, the SP module 2013 of the scheduling extension unit 201 would send an enqueuing report to the scheduling unit 202, i.e., giving priority to the authorization when an authorization arrives, and processing the enqueuing report when no authorization arrives.

Exemplarily, as shown in FIG. 4, the queue scheduling device 20 may further include a dequeuing management unit 204 configured for reading the queue out of the queue cache and sending current queue information of the queue to the scheduling unit 202 as a dequeuing report.

Exemplarily, the scheduling unit 202 may be specifically configured for:

setting a scheduling state of the queue for indicating whether the queue is to be scheduled.

The scheduling unit 202 conducts different processing according to different types of received reports. In the embodiment, preferably, after receiving the enqueuing report or the authorization report, the scheduling unit 202 is further specifically configured for:

scheduling the queue and setting a scheduling state of the queue as a scheduling joined state when a scheduling state of the queue is a scheduling-unjoined state, and a queue depth and a queue authorized value of the queue are not zero; and discarding the enqueuing report or the authorization report and stopping processing the queue when a scheduling state of the queue is a scheduling-joined state, and a queue depth or a queue authorized value of the queue is zero.

Optionally, after receiving the dequeuing report, the scheduling unit 202 is further specifically configured for:

scheduling the queue and keeping a scheduling state of the queue unchanged when a queue depth of the queue is not zero and a queue authorized value of the queue is not zero; and discarding the dequeuing report and setting a scheduling state of the queue as a scheduling-unjoined state when a condition that the queue depth of the queue is not zero and the queue authorized value of the queue is not zero is not met.

Further, after the scheduling unit receives the dequeuing report, and when the scheduling unit 202 determines that the queue does not meet a condition that the queue authorized value is not zero, the scheduling unit 202 would send an authorization request to the authorization unit 203 and wait for a new authorization, sent by the authorization unit 203, regarding the queue.

It should be noted that the queue scheduling device 20 only includes a functional unit for scheduling of writing, authorizing and reading a queue. Specific functional units for realizing processes for writing, authorizing and reading a queue will not be repeated again in the embodiment since they belong to common general knowledge in the art.

Embodiments of the present disclosure provide a queue scheduling device 20. By arranging a scheduling extension unit 201 in front of the scheduling unit 202 and maintaining, by the scheduling extension unit 201, the queue identifier cache and a state of the queue identifier, the queue scheduling device 20 reduces bandwidth sent to the scheduling unit 202 and is capable of adapting to high-speed and mass-storage queue scheduling, realizes wire speed enqueuing and wire speed dequeuing and ensures that a queue management processes QoS requirements for bandwidth and traffic management when an authorization arrives.

Embodiments of the present disclosure further provide a computer storage medium in which a computer executable instruction is stored and is used for executing the method in embodiments of the present disclosure.

Those skilled in the art should understand that embodiments of the present disclosure can provide a method, system or computer program product. Therefore, the present disclosure can adopt a form of a hardware embodiment, a is software embodiment or an embodiment combining software and hardware. Moreover, the present disclosure can adopt a form of a computer program product capable of being implemented on one or more computer available storage media (including but not limited to disk memory, optical memory, etc.) containing computer available program codes.

The present disclosure is described with reference to flow diagrams and/or block diagrams according to the method, device (system) and computer program product in embodiments of the present disclosure. It should be understood that each flow and/or block in the flow diagrams and/or block diagrams and a combination of flows and/or blocks in the flow diagrams and/or block diagrams can be realized through computer program instructions. The computer program instructions can be provided for a processor of a general-purpose computer, a special-purpose computer, an embedded processor, or other programmable data processing devices to generate a machine, so that a device for realizing designated functions in one or more flows of the flow diagrams and/or one or more blocks of the block diagrams is generated through the instructions executed by the processor of the computer or other programmable data processing devices.

The computer program instructions may further be stored in a computer readable memory which can guide the computer or other programmable data processing devices to operate in a special mode, so that the instructions stored in the computer readable memory generate a manufactured product including an instruction device, the instruction device realizing designated functions in one or more flows of the flow diagrams and/or one or more blocks of the block diagrams.

The computer program instructions may further be loaded on the computer or other programmable data processing devices, so that a series of operation steps are executed on the computer or other programmable devices to generate processing realized by the computer. Therefore, the instructions executed on the computer or other programmable devices provide steps for realizing designated functions in one or more flows of the flow diagrams and/or one or more blocks of the block diagrams.

The above only describes embodiments of the present disclosure and is not intended to limit the protection scope of the present disclosure.

What is claimed is:

1. A queue scheduling method, wherein a scheduling extension unit is arranged, comprising:

receiving an enqueuing trigger message by the scheduling extension unit after a queue is written in a queue cache, wherein the enqueuing trigger message includes a queue identifier;

writing the queue identifier in a queue identifier cache and setting a state of the queue identifier to be in the queue identifier cache by the scheduling extension unit;

acquiring queue information of the queue and sending an enqueuing report to a scheduling unit by the scheduling extension unit when no authorization arrives; and determining, by the scheduling unit, whether to schedule the queue according to the queue information of the queue;

wherein the queue information comprises a queue depth and a queue authorized value;

determining, by the scheduling unit, whether to schedule the queue according to the queue information of the queue comprises: the scheduling unit setting a scheduling state of the queue; and determining, by the scheduling unit, whether the queue is to be scheduled according to the queue information of the queue after the scheduling unit receives the enqueuing report, comprises:

the scheduling unit scheduling the queue and setting a scheduling state of the queue as a scheduling-joined state when a scheduling state of the queue is a scheduling-unjoined state and a queue depth and a queue authorized value of the queue are not zero; and the scheduling unit discarding the enqueuing report and stopping processing the queue when the scheduling state of the queue is a scheduling-joined state and a queue depth or a queue authorized value of the queue is zero.

2. The method according to claim 1, wherein writing the queue identifier in a queue identifier cache and setting a state of the queue identifier to be in the queue identifier cache by the scheduling extension unit, comprises:

searching the queue identifier cache by the scheduling extension unit according to the queue identifier;

writing the queue identifier in the queue identifier cache and setting a state of the queue identifier to be in the queue identifier cache when the queue identifier is not in the queue identifier cache; and stopping processing the queue identifier cache and the state of the queue identifier when the queue identifier is in the queue identifier cache.

3. The method according to claim 2, further comprising:
reading the queue out of the queue cache and sending current queue information of the queue to the scheduling unit as a dequeuing report.

4. The method according to claim 3, wherein
determining, by the scheduling unit, whether to schedule the queue according to the queue information of the queue after the scheduling unit receives the dequeuing report, comprises:
the scheduling unit scheduling the queue and keeping a scheduling state of the queue unchanged when a queue depth of the queue is not zero and a queue authorized value of the queue is not zero; and
the scheduling unit discarding the dequeuing report and setting a scheduling state of the queue as a scheduling-unjoined state when a condition that the queue depth of the queue is not zero and the queue authorized value of the queue is not zero is not met.

5. The method according to claim 1, wherein sending an enqueuing report to a scheduling unit by the scheduling extension unit when no authorization arrives, comprises:
reading the queue identifier from the queue identifier cache and setting a state of the queue identifier to be not in the queue identifier cache;
reading the queue information of the queue to form an enqueuing report according to the read queue identifier; and
sending the enqueuing report to the scheduling unit.

6. The method according to claim 5, further comprising:
reading the queue out of the queue cache and sending current queue information of the queue to the scheduling unit as a dequeuing report.

7. The method according to claim 1, further comprising:
reading, by the scheduling extension unit when an authorization arrives, the queue information of the queue according to an authorized queue number when an authorization arrives to form an authorization report; and
sending the authorization report to the scheduling unit.

8. The method according to claim 7, further comprising:
reading the queue out of the queue cache and sending current queue information of the queue to the scheduling unit as a dequeuing report.

9. The method according to claim 7, wherein determining, by the scheduling unit, whether the queue is to be scheduled according to the queue information of the queue after the scheduling unit receives the authorization report, comprises:
the scheduling unit scheduling the queue and setting a scheduling state of the queue as a scheduling-joined state when a scheduling state of the queue is a scheduling-unjoined state, and a queue depth and a queue authorized value of the queue are not zero; and
the scheduling unit discarding the authorization report and stopping processing the queue when the scheduling state of the queue is a scheduling-joined state, and a queue depth or a queue authorized value of the queue is zero.

10. The method according to claim 1, further comprising:
reading the queue out of the queue cache and sending current queue information of the queue to the scheduling unit as a dequeuing report.

11. The method according to claim 10, wherein
determining, by the scheduling unit, whether to schedule the queue according to the queue information of the queue after the scheduling unit receives the dequeuing report, comprises:
scheduling the queue and keeping a scheduling state of the queue unchanged by the scheduling unit when a queue depth of the queue is not zero and a queue authorized value of the queue is not zero; and
discarding the dequeuing report and setting a scheduling state of the queue as a scheduling-unjoined state by the scheduling unit when a condition that the queue depth of the queue is not zero and the queue authorized value of the queue is not zero is not met.

12. A queue scheduling device, comprising:
a processor and a storage device, wherein the storage device stores processor-executable programs, and the programs comprise a scheduling extension unit and a scheduling unit, wherein
the scheduling extension unit is configured for: receiving an enqueuing trigger message after a queue is written in a queue cache, wherein the enqueuing trigger message includes a queue identifier and queue information of a queue;
writing the queue identifier in the queue identifier cache and setting a state of the queue identifier to be in the queue identifier cache; and
acquiring queue information of the queue and sending an enqueuing report to the scheduling unit when no authorization arrives;
the scheduling unit is configured for: determining whether to schedule the queue according to the queue information of the queue;
wherein the queue information comprises a queue depth and a queue authorized value;
the scheduling unit is configured for setting a scheduling state of the queue; and
after receiving the enqueuing report, the scheduling unit is further configured for: scheduling the queue and setting a scheduling state of the queue as a scheduling-joined state when a scheduling state of the queue is a scheduling-unjoined state and a queue depth and a queue authorized value of the queue are not zero; and
discarding the enqueuing report and stopping processing the queue when a scheduling state of the queue is a scheduling-joined state and a queue depth or a queue authorized value of the queue is zero.

13. The device according to claim 12, wherein the scheduling extension unit is configured for:
searching the queue identifier cache according to the queue identifier;
writing the queue identifier in the queue identifier cache and setting a state of the queue identifier to be in the queue identifier cache when the queue identifier is not in the queue identifier cache; and
stopping processing the queue identifier cache and the state of the queue identifier when the queue identifier is in the queue identifier cache.

14. The device according to claim 12, further comprising an authorization unit configured for sending an authorization to the scheduling unit through the scheduling extension unit;
when no authorization arrives, the scheduling extension unit is configured for:
reading the queue identifier from the queue identifier cache and setting a state of the queue identifier to be not in the queue identifier cache;

reading the queue information of the queue to form an enqueuing report according to the read queue identifier; and sending the enqueuing report to the scheduling unit.

15. The device according to claim 14, further comprising a dequeuing management unit configured for reading the queue out of the queue cache and sending current queue information of the queue to the scheduling unit as a dequeuing report.

16. The device according to claim 12, wherein when an authorization arrives, the scheduling extension unit is configured for:

reading the queue information of the queue according to an authorized queue number when an authorization arrives to form an authorization report; and sending the authorization report to the scheduling unit.

17. The device according to claim 16, wherein after receiving the authorization report, the scheduling unit is further configured for:

scheduling the queue and setting a scheduling state of the queue as a scheduling-joined state when a scheduling state of the queue is a scheduling-unjoined state and a queue depth and a queue authorized value of the queue are not zero; and discarding the authorization report and stopping processing the queue when a scheduling state of the queue is a scheduling-joined state and a queue depth or a queue authorized value of the queue is zero.

18. The device according to claim 12, further comprising a dequeuing management unit configured for reading the queue out of the queue cache and sending current queue information of the queue to the scheduling unit as a dequeuing report.

19. The device according to claim 18, after receiving the dequeuing report, the scheduling unit is further configured for:

scheduling the queue and keeping a scheduling state of the queue unchanged when a queue depth of the queue is not zero and a queue authorized value of the queue is not zero; and discarding the dequeuing report and setting a scheduling state of the queue as a scheduling-unjoined state when a condition that the queue depth of the queue is not zero and the queue authorized value of the queue is not zero is not met.

20. A non-transitory computer storage medium, in which a computer executable instruction is stored and is used for executing a queue scheduling method, wherein a scheduling extension unit is arranged, comprising:

receiving an enqueuing trigger message by the scheduling extension unit after a queue is written in a queue cache, wherein the enqueuing trigger message includes a queue identifier;

writing the queue identifier in a queue identifier cache and setting a state of the queue identifier to be in the queue identifier cache by the scheduling extension unit;

acquiring queue information of the queue and sending an enqueuing report to a scheduling unit by the scheduling extension unit when no authorization arrives; and determining, by the scheduling unit, whether to schedule the queue according to the queue information of the queue;

wherein the queue information comprises a queue depth and a queue authorized value;

determining, by the scheduling unit, whether to schedule the queue according to the queue information of the queue comprises: the scheduling unit setting a scheduling state of the queue; and determining, by the scheduling unit, whether the queue is to be scheduled according to the queue information of the queue after the scheduling unit receives the enqueuing report, comprises:

the scheduling unit scheduling the queue and setting a scheduling state of the queue as a scheduling-joined state when a scheduling state of the queue is a scheduling-unjoined state, and a queue depth and a queue authorized value of the queue are not zero; and the scheduling unit discarding the enqueuing report and stopping processing the queue when the scheduling state of the queue is a scheduling-joined state; and a queue depth or a queue authorized value of the queue is zero.

* * * * *